US 10,458,259 B2

United States Patent
Allen et al.

(10) Patent No.: US 10,458,259 B2
(45) Date of Patent: Oct. 29, 2019

(54) ENGINE COMPONENT WALL WITH A COOLING CIRCUIT

(71) Applicant: General Electric Company, Schenectady, NY (US)

(72) Inventors: Jason Randolph Allen, Loveland, OH (US); Ronald Scott Bunker, West Chester, OH (US)

(73) Assignee: General Electric Company, Schenectady, NY (US)

( * ) Notice: Subject to any disclaimer, the term of this patent is extended or adjusted under 35 U.S.C. 154(b) by 849 days.

(21) Appl. No.: 15/152,887

(22) Filed: May 12, 2016

(65) Prior Publication Data

US 2017/0328221 A1    Nov. 16, 2017

(51) Int. Cl.
*F01D 5/18* (2006.01)
*F01D 9/04* (2006.01)

(52) U.S. Cl.
CPC .......... *F01D 9/041* (2013.01); *F01D 5/183* (2013.01); *F01D 5/186* (2013.01); *F05D 2230/31* (2013.01); *F05D 2260/202* (2013.01); *F05D 2260/203* (2013.01); *F05D 2300/514* (2013.01); *Y02T 50/672* (2013.01); *Y02T 50/676* (2013.01)

(58) Field of Classification Search
CPC . F01D 5/18; F01D 5/182; F01D 5/183; F01D 5/186; F01D 5/187; F01D 9/041; F01D 9/065; F01D 25/12; F05D 2300/514; F05D 2260/202; F05D 2260/203; F05D 2260/204
USPC ....................................................... 416/97 A
See application file for complete search history.

(56) References Cited

U.S. PATENT DOCUMENTS

| | | |
|---|---|---|
| 5,363,645 A | 11/1994 | Pellet |
| 5,383,766 A | 1/1995 | Przirembel et al. |
| 5,641,014 A | 6/1997 | O'Connor et al. |
| 5,810,552 A | 9/1998 | Frasier |
| 6,255,000 B1 | 7/2001 | O'Connor et al. |
| 6,375,425 B1 | 4/2002 | Lee et al. |
| 6,443,700 B1 | 9/2002 | Grylls et al. |
| 6,461,107 B1 | 10/2002 | Lee et al. |
| 6,499,949 B2 | 12/2002 | Schafrik et al. |
| 6,551,061 B2 | 4/2003 | Darolia et al. |
| 6,617,003 B1 | 9/2003 | Lee et al. |
| 6,637,500 B2 | 10/2003 | Shah et al. |
| 6,905,302 B2 | 6/2005 | Lee et al. |
| 7,246,993 B2 * | 7/2007 | Bolms ..................... F01D 25/12 415/116 |

(Continued)

FOREIGN PATENT DOCUMENTS

| | | |
|---|---|---|
| EP | 1 475 567 A1 | 11/2004 |
| EP | 1 803 897 A2 | 7/2007 |

OTHER PUBLICATIONS

International Search Report and Written Opinion issued in connection with corresponding PCT Application No. PCT/US2017/026482 dated Jan. 26, 2018.

*Primary Examiner* — Richard A Edgar
*Assistant Examiner* — Elton K Wong
(74) *Attorney, Agent, or Firm* — McGarry Bair PC

(57) ABSTRACT

An apparatus and method for flowing cooling air through an outer wall of an engine component such as an airfoil. The airfoil having the outer wall can include an opening. A framework can be disposed in the opening adapted to reduce the required flow through the opening to increase the efficiency of the engine and improve cooling.

32 Claims, 6 Drawing Sheets

(56) References Cited

U.S. PATENT DOCUMENTS

| | | |
|---|---|---|
| 7,513,744 B2 | 4/2009 | Cunha et al. |
| 7,658,590 B1 | 2/2010 | Spanks |
| 8,387,245 B2 | 3/2013 | Bunker et al. |
| 8,499,566 B2 | 8/2013 | Lacy et al. |
| 8,528,208 B2 | 9/2013 | Rebak et al. |
| 8,575,513 B2 | 11/2013 | Abdo et al. |
| 8,673,397 B2 | 3/2014 | Bunker et al. |
| 8,727,727 B2 | 5/2014 | Bunker et al. |
| 8,753,071 B2 | 6/2014 | Bunker |
| 8,815,371 B2 | 8/2014 | Arrell et al. |
| 8,974,859 B2 | 3/2015 | Bunker |
| 9,003,657 B2 | 4/2015 | Bunker et al. |
| 2001/0042607 A1 | 11/2001 | Roesler et al. |
| 2011/0262695 A1* | 10/2011 | Lee .................. F01D 5/182 428/131 |
| 2015/0064019 A1 | 3/2015 | Lacy et al. |
| 2015/0321289 A1 | 11/2015 | Bruck et al. |
| 2015/0345302 A1* | 12/2015 | Birnkrant .......... C04B 38/0054 416/97 A |
| 2016/0332229 A1* | 11/2016 | Snyder ................ F01D 25/12 |

\* cited by examiner

ENGINE COMPONENT WALL WITH A COOLING CIRCUIT

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft, for example, are designed to operate at high temperatures to maximize engine efficiency, so cooling of certain engine components, such as the high pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine airfoils generally include one or more interior cooling passages for routing the cooling air through the airfoil to cool different portions, such as the walls of the airfoil. Often, film holes are used to provide the cooling air from the interior cooling passages to form a surface cooling film to separate the hot air form the airfoil. However, the film holes provide the surface cooling film to a discrete, local portion of the airfoil and require a large flow to maintain proper surface cooling over an area of the airfoil exterior surface.

BRIEF DESCRIPTION OF THE INVENTION

In one aspect, embodiments of the invention relate to an airfoil for a turbine engine including an outer wall having an outer surface and an inner surface bounding an interior. The outer wall includes a pressure side and a suction side extending axially between a leading edge and a trailing edge and extending radially between a root and a tip. The airfoil further includes at least one opening formed in the outer wall, a framework provided within the at least one opening and made from solid elements coupled to the outer wall, with interstitial spaces defined by the solid elements, and a porous structure provided in at least some of the interstitial spaces.

In another aspect, embodiments of the invention relate to an engine component for a turbine engine, which generates a hot combustion gas flow, and provides a cooling fluid flow, including a wall separating the hot combustion gas flow from the cooling fluid flow and having a first surface along with the hot combustion gas flow in a hot flow path and a second surface facing the cooling fluid flow. The engine component further includes at least one opening formed in the outer wall, a framework provided within the at least one opening and made from solid elements coupled to the outer wall, with interstitial spaces defined by the solid elements, and a porous structure provided in at least some of the interstitial spaces.

In yet another aspect, embodiments of the invention relate to a method of making an airfoil for a turbine engine comprising forming a wall with an opening having a framework within the opening that defines interstitial spaces, at least some of which are filled by a porous structure.

DESCRIPTION OF EMBODIMENTS OF THE INVENTION

Figure 1:
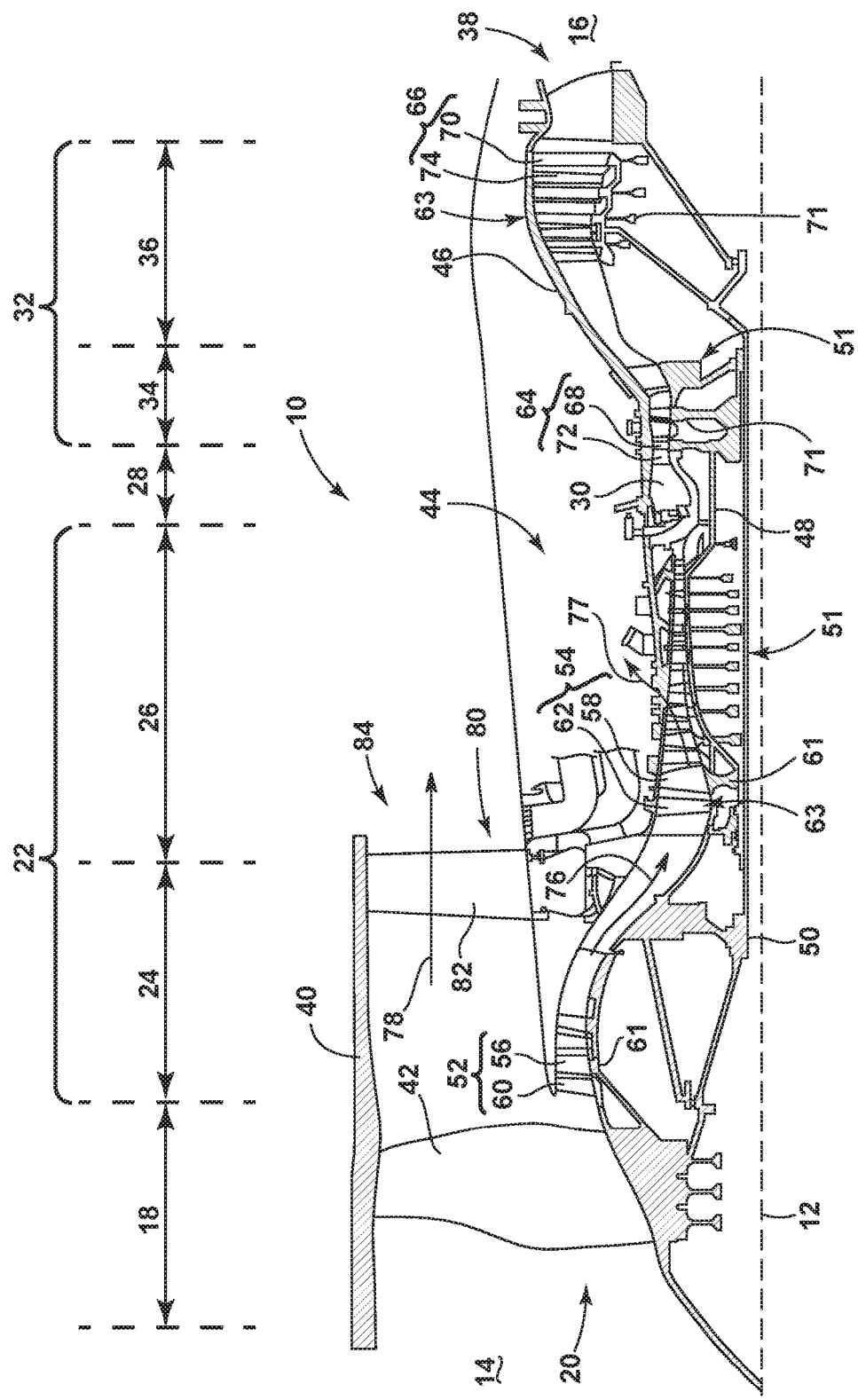
FIG. 1 is a schematic, cross-sectional view diagram of a gas turbine engine for an aircraft.

The described embodiments of the present invention are directed to a wall of an engine component for providing a flow of cooling fluid to a hot surface. For purposes of illustration, the present invention will be described with respect to an airfoil for the turbine of an aircraft gas turbine engine. It will be understood, however, that the invention is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be draw from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
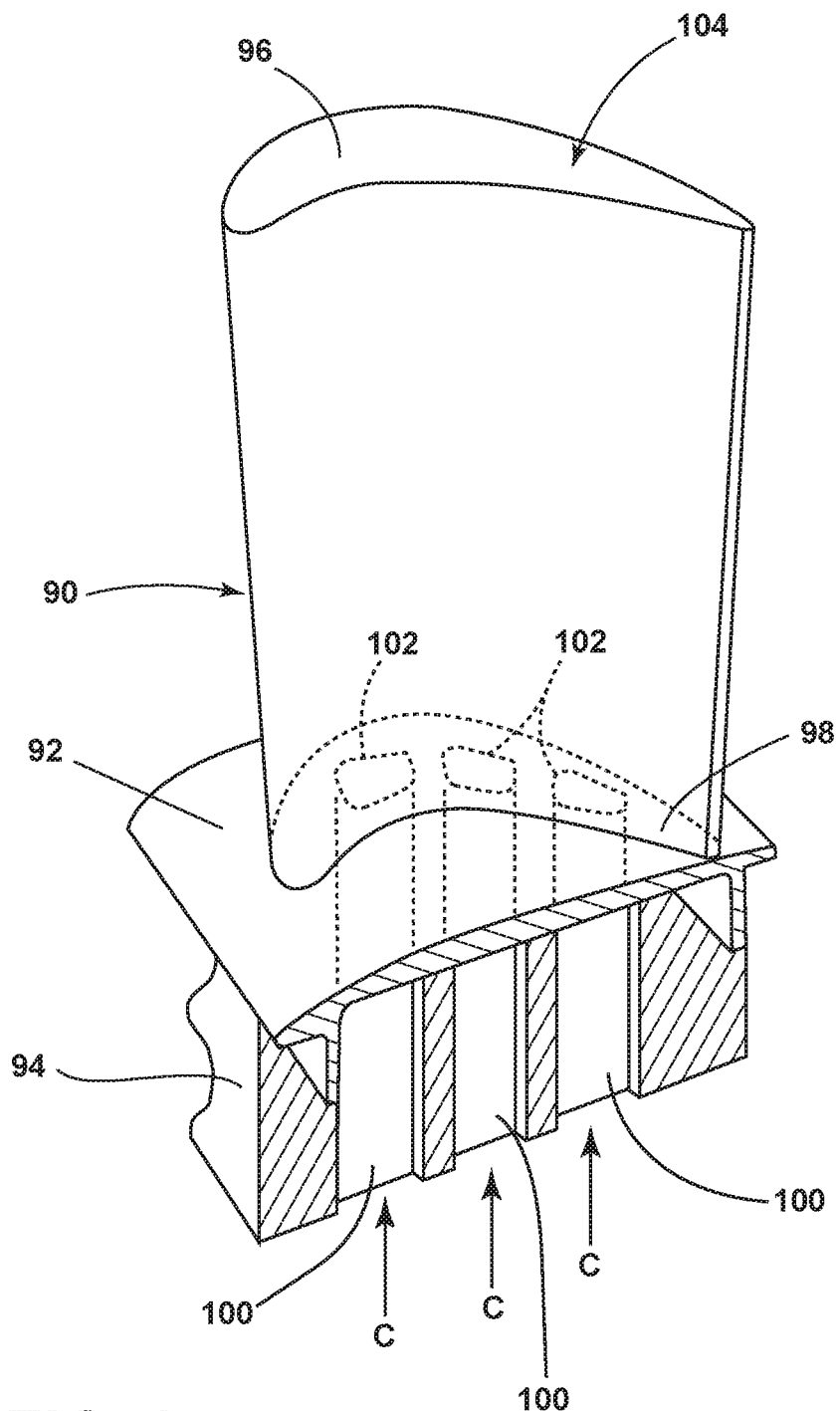
FIG. 2 is a perspective view of an engine component in the form of an airfoil as a blade of the turbine engine of FIG. 1.

FIG. 2 is a perspective view of an engine component in the form of an airfoil 90, a platform 92, and a dovetail 94, which can mount to the disk 71 of the engine 10 of FIG. 1 as a rotating blade, or alternatively, can be a stationary vane. The airfoil 90 includes a tip 96 and a root 98, defining a span-wise direction therebetween. The airfoil 90 mounts to the platform 92 at the root 98. The platform 92 as shown is only a section, and can be an annular band for mounting a plurality of airfoils 90. The airfoil 90 can fasten to the platform 92, such as welding or mechanical fastening, or can be integral with the platform 92. The dovetail 94 couples to the platform 92 opposite of the airfoil 90, and can be configured to mount to the disk 71, or rotor 51 of the engine 10. The dovetail 94 can include one or more inlet passages 100, having an outlet 102 disposed at the root 98. It should be appreciated that the dovetail 94 is shown in cross-section, such that the inlet passages 100 are housed within the body of the dovetail 94. The inlet passages 100 can provide a cooling fluid flow C to an interior 104 of the airfoil 90 for cooling of the airfoil 90 in one non-limiting example. It should be understood that while the description herein is related to an airfoil, it can have equal applicability in other engine components requiring cooling such as film cooling. Such engine components can include but are not limited to, a shroud, a blade, a vane, or a combustion liner.

Figure 3:
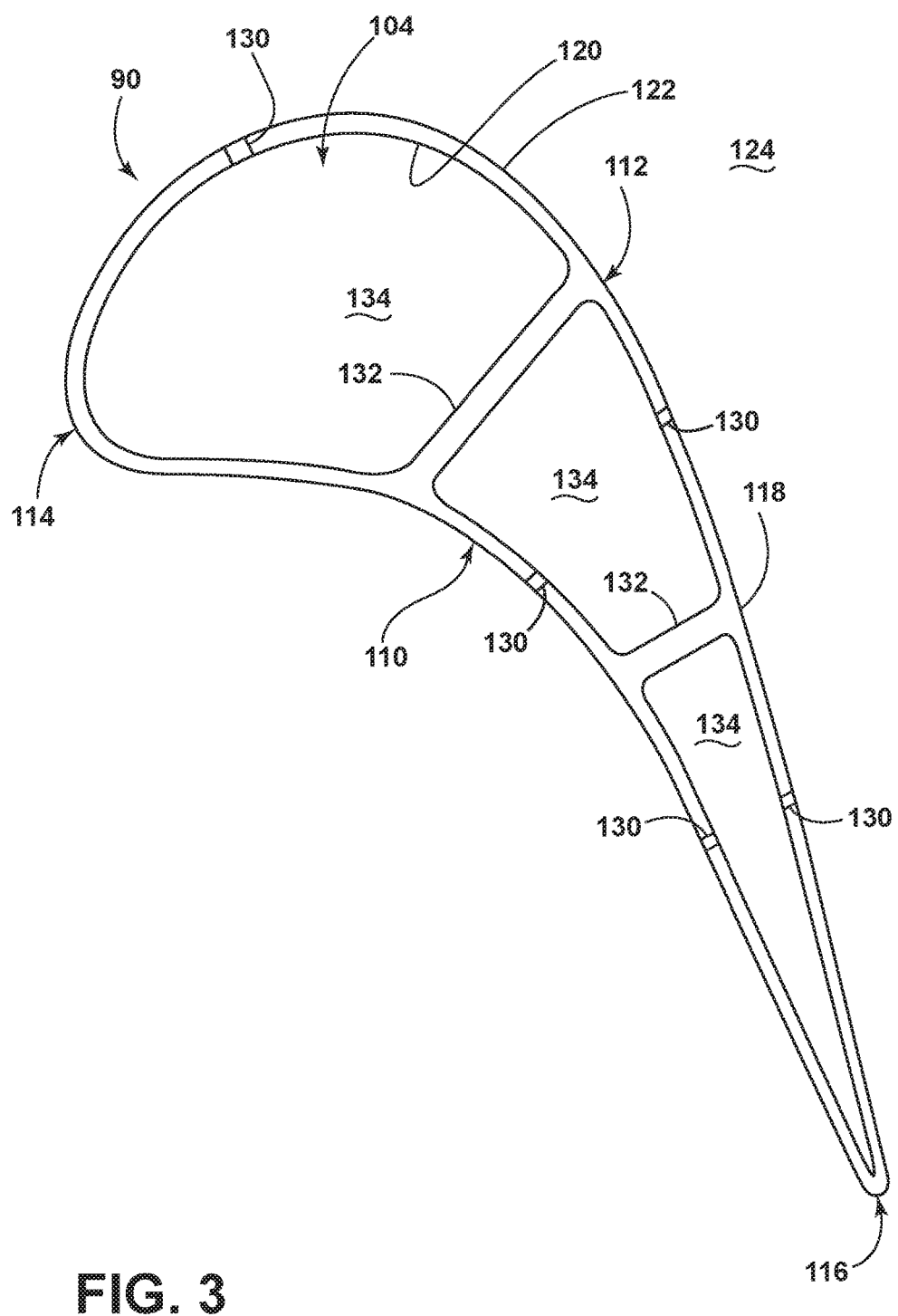
FIG. 3 is a cross-sectional view of the airfoil of FIG. 2 including a wall.

Referring to FIG. 3, the airfoil 90, shown in cross-section, has a concave-shaped pressure sidewall 110 and a convex-shaped suction sidewall 112 with a leading edge 114 and a trailing edge 116 defining a chord-wise direction therebetween. The pressure and suction sidewalls 110, 112 define an outer wall 118 bounding the interior 104. The airfoil 90 as an exemplary blade, rotates in a direction such that the pressure sidewall 110 follows the suction sidewalls 112. Thus, as shown in FIG. 3, the airfoil 90 would rotate upward toward the top of the page. As a stationary vane, the airfoil 90 would not rotate.

The outer wall 118 includes an inner surface 120 and an outer surface 122. The inner surface 122 bounds the interior 104 while the outer surface confronts an exterior 124. The outer wall 118 includes one or more openings 130. Ribs 132 can be included in the interior of the airfoil 90. The ribs 132 can extend between the pressure sidewall 110 and the suction sidewall 112, coupling to or being integral with the outer wall 118. One or more interior passages 134 are defined by the ribs 132 and the outer wall 118, extending in the span-wise direction. The interior passages 134 can be fed with the flow of cooling fluid C provided to the passages 134 from the dovetail 94 (FIG. 2). Such a flow of cooling fluid C can pass through the openings 130 from the interior 104 of the airfoil 90 to the exterior.

Figure 4:
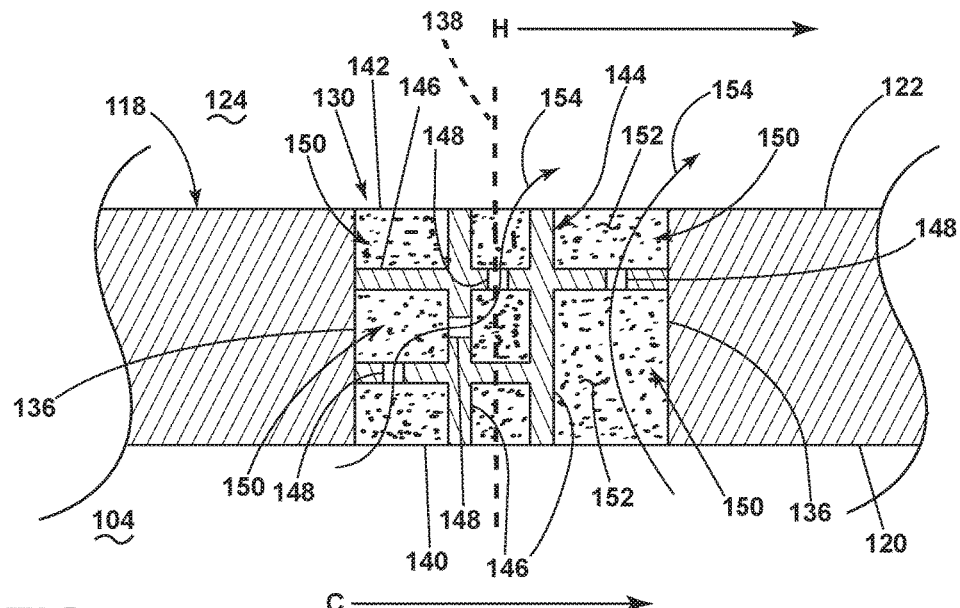
FIG. 4 is a cross-sectional view of the wall of the airfoil of FIG. 3, including an opening in the wall including a framework according to an embodiment of the invention.

Referring to FIG. 4, an enlarged cross-sectional view of the outer wall 118, separating a cooling fluid flow C from a hot combustion gas H, better illustrates the openings 130 of the outer wall 118 having opposing sidewalls 136. A centerline 138 can be defined through the center of the opening 130. It should be understood that the cross-sectional view illustrates the opposing sidewalls 136, while it is contemplated that the opening 130 can have a single, continuous sidewall, such as a circle, slot, or oval opening, being illustrated as opposing walls in the cross-sectional view. Additionally, the sidewalls 136 need not be linear. It is contemplated that the sidewalls 136 can be arcuate, angled, or discretely formed along the wall with combinations or linear, non-linear, or angle. An inlet 140 for the opening 130 is disposed on the inner surface 120 and an outlet 142 is disposed on the outer surface 122. The openings 130 can be a single opening 130 or can be multiple openings 130. The openings 130 can be arranged randomly, discretely, or in a pattern, which can have a constant or varying density of openings, in non-limiting examples. Further examples can include arranging the openings 130 in rows, sets, clusters, shapes, or other organizations.

A framework 144 is provided within the opening 130. The framework 144 is made of solid elements 146 and couples to the outer wall 118. Alternatively, the framework 144 and the solid elements 146 can be integral with the outer wall 118. The solid elements 146 can be individual members such that a plurality of solid elements 146 are interconnected to form the framework 144. The solid elements 146 can be elongated members, disposed between the sidewalls 136 at the opening 130, or extending between the inlet 140 and the outlet 142. The solid elements 146 can be disposed parallel to the centerline 138. Alternatively, the solid elements 146 can be non-parallel, or a combination of parallel and non-parallel. As such, the solid elements 146 can be linear. In another example, the solid elements 146 can be angled, or can have extensions defining angled extensions. Furthermore, the solid elements 146 can extend only partially between the sidewalls 136 or the inlet 140 and the outlet 142. Further still, the solid elements 146 can be shorter members, interconnecting other solid elements 146. The combined solid elements 146 can define a mesh, interlaced structure, or a lattice for the framework 144. Some of the solid elements 146 can be coupled to one another while some solid elements 146 are not coupled to each other, or any combination thereof. The framework 144 and solid elements 146 can be made of similar material as the outer wall 118, or can be made of different material. For example, the framework 144, solid elements 146, and outer wall 118 can be made of high strength superalloy metals, typically used for durability while minimizing the need for cooling. Such materials can include, but are not limited to nickel, cobalt, or iron based superalloys, ceramic matrix composites, steel, or refractory metals such as titanium. It should be understood that the solid elements 146 are made of a non-porous material, being impermeable, such that the passage of fluids such as air is prevented from moving through the solid elements 146, except through discrete apertures or orifices as described herein.

Discrete orifices 148 can be formed in one or more of the solid elements 146. Interstitial spaces 150 are defined by the solid elements 146 within the framework 144. The solid elements 146 can be organized such that interstitial spaces 150 are defined having different cross-sectional areas than other interstitial spaces 150. As illustrated in FIG. 4, eight interstitial spaces 150 are defined by the solid elements 146 and the outer wall 118, while any number of interstitial spaces 150 are contemplated. A porous structure 152 is provided in the interstitial spaces 150. The discrete orifices 148 can include the porous structure 152, or can be empty, without the porous structure 152. Additionally, it is contemplated that at least a portion of the discrete orifices 148 can include the porous structure 152.

The porous structure 152 can define a porosity, being permeable by a volume of fluid, such as air. The porous structure 152 can have a particular porosity to meter a flow of a fluid passing through the porous structure 152 at a predetermined rate. The porous structure 152 can be made of any of the materials described for the framework 144, solid elements 146, or the outer wall 118, such that a porosity is defined. In one non-limiting example, the porous structure 152 can be an open cell porous metallic structure made of Ni, NiCrAlY, NiAl, or similar materials. The open cell porous structure can further be made of a nickel foam, for example. The porous structure 152 can be a bonded material that is an open cell or patterned material built by additive manufacturing.

A combination of the discrete orifices 148 in the solid elements 146, the interstitial spaces 150, and the porous structure 152 can define a flow path 154. While the flow paths 154 are illustrated in the cross-sectional view of FIG. 4 as being disposed within the two-dimensional plane of the page, it should be understood that the discrete orifices 148, interstitial spaces 150, and porous structures 152 can be organized in a three-dimensional orientation such that a flow path can move in three-dimensional space. Such an example can include passing a flow of fluid along a flow path from the inlet 140 to the outlet 142 while also moving in a span-wise direction through the opening 130.

It should be understood that the flow paths 154 as illustrated are exemplary. Any number or organization of solid elements 146, discrete orifices 148, interstitial spaces 150, or porous structures can define the flow path 154.

Figure 5:
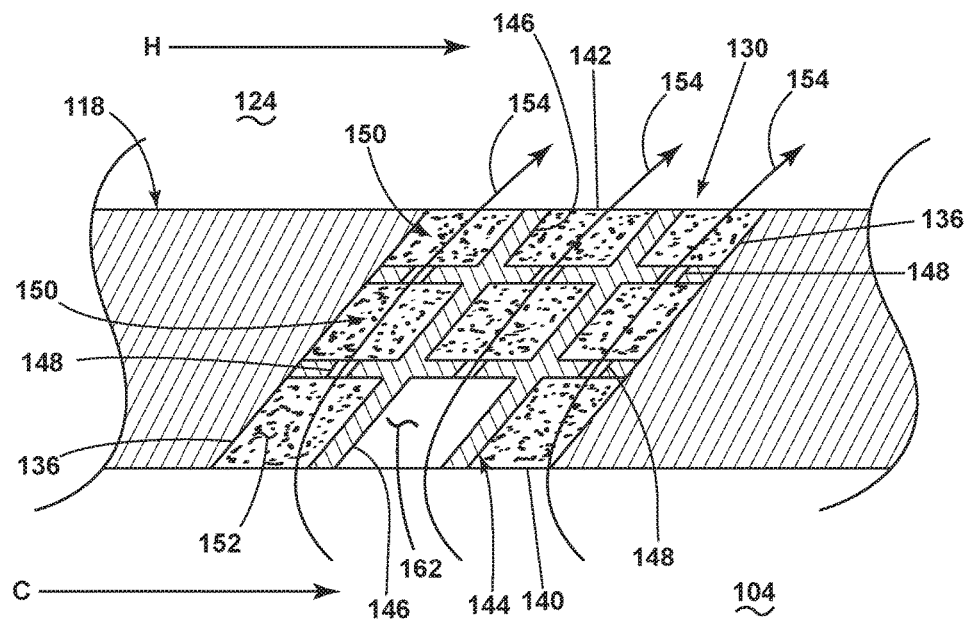
FIG. 5 is a cross-sectional view of the wall of FIG. 3, including an opening in the wall having an angled framework according to an embodiment of the invention.

Referring now to FIG. 5, the sidewalls 136 and the solid elements 146 can be oriented at an angle 160 relative to the outer wall 118. Angled solid elements 146 can define angled portions of the framework 144. The angle 160 can be between 15 degrees and 90 degrees, and can be 45 degrees in one non-limiting example. It should be understood that the solid elements 146 are not limited to being angled in-plane, but can be angled out of plane in three-dimensional space. Furthermore, the solid elements 146 can be angled, twisted, arcuate, or any other orientation in non-limiting examples. The interstitial spaces 150 can be empty, illustrated as an empty space 162. Thus, is should be understood that the porous structure can be disposed in some or all of the interstitial spaces 150.

The discrete orifices 148 are arranged in such a way that three parallel flow paths 154 are defined through the opening 130. The angled disposition of the solid elements 146 and the opening 130 can be used to direct the flow paths 154 to exhaust, for example, a surface cooling film along the outer surface 122 having a particular directionality. Furthermore, the size of the discrete orifices 148 and the porosity of the porous structure 152 can be used to meter the flow of the fluid through the opening 130. As such, the required volume of cooling fluid can be reduced as cooling efficiency through the opening is improved.

Figure 6:
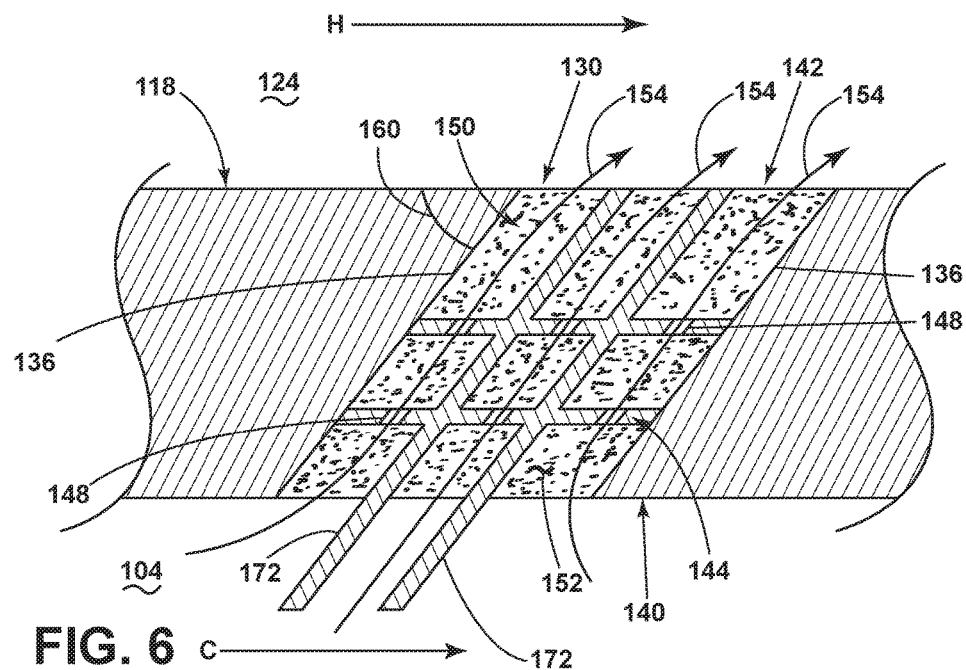
FIG. 6 is a cross-sectional view of the wall of FIG. 3, including an opening in the wall having a framework extending into an interior of the airfoil according to an embodiment of the invention.
Figure 7:
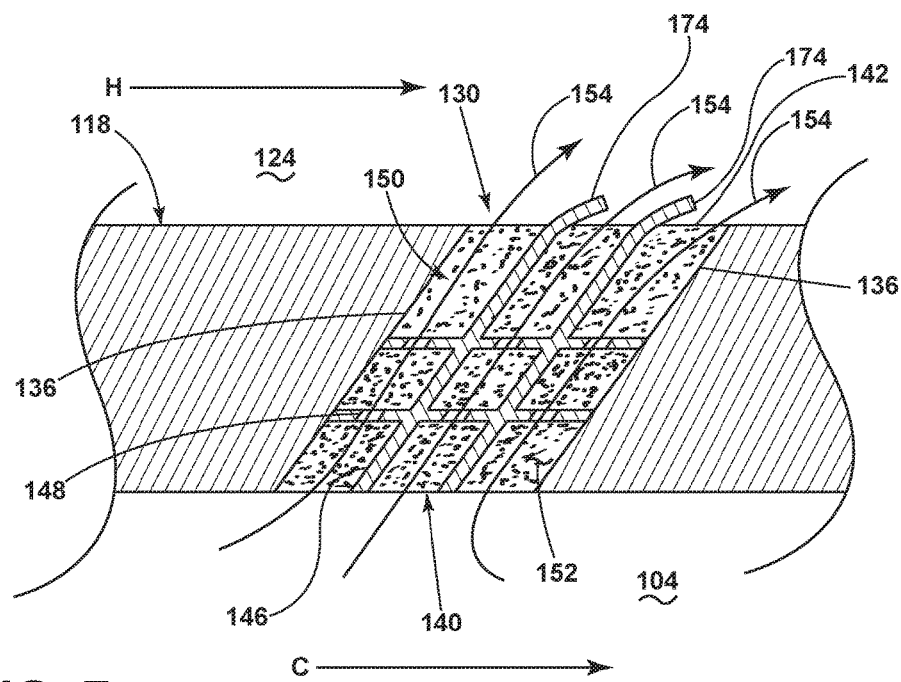
FIG. 7 is a cross-sectional view of the wall of FIG. 3, including an opening in the wall having a framework extending external of the airfoil according to an embodiment of the invention.

Referring now to FIGS. 6 and 7, the solid elements 146 can extend beyond the inlet 140 and the outlet 142 into the interior 104 or the exterior 124, respectively. In a first example illustrated in FIG. 6, the framework 144 includes two end portions as two extensions 172 extending into the interior 104. The extensions 172 can be integral to one or more solid elements 146, or can be additional solid elements 146 which couple to other solid elements 146 as part of the framework 144. The extensions 172 can be linear and can be angled to direct a flow of fluid entering the opening 130 providing directionality to the flow path 154. Alternatively, as shown in another example illustrated in FIG. 7, exterior end portions or extensions 174 can extend from the outlet 142 to the exterior 124 of the airfoil. Such extensions 174 can be arcuate, directing the flow path 154 along the outer surface 122, such as for providing directionality to a surface cooling film along the outer surface 122. The extensions 172, 174 can be angled and can be located within the inlet 140 or the outlet 142

It should be understood that FIGS. 6 and 7 are exemplary, illustrating that the framework 144 can extend beyond the opening 130. Such extensions 172, 174 can be linear, arcuate, curvilinear, or any combination thereof, extending in any direction in three-dimensional space to direct a flow of cooling fluid. Such extensions 172, 174, for example, can be angled to defined angled extensions.

Figure 8:
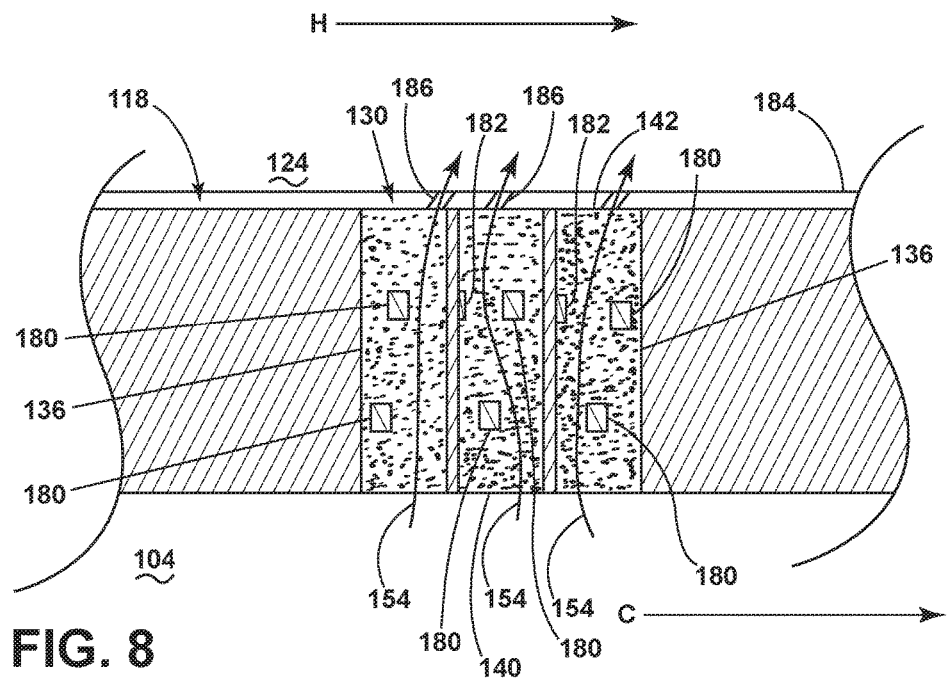
FIG. 8 is a cross-sectional view of the wall of FIG. 3, including an opening in the wall having a framework including discrete framework members arranged within a porous structure according to an embodiment of the invention.

Referring now to FIG. 8 the framework 144 can include discrete solid elements 180. Such discrete elements 180 can be formed of the same material as the framework 144, other solid elements 146, or another material. The discrete solid elements 180 can be formed within the porous structure 152. Such a framework 144 as illustrated can be created utilizing additive manufacturing, for example. In another example, the discrete solid elements 180 can be pre-positioned, having a porous structure 152, such as a nickel foam, formed around the discrete solid elements 180. In another example, the discrete solid elements 182 can couple to or be integral with other solid elements 146. Such discrete solid elements 182 can provide for improved bonding of the porous structure 152, as well as improved directional thermal and mechanical composite properties.

The discrete solid elements 180, 182 can provide additional directionality for the flow path 154 passing through the interstitial spaces 150 or the porous structure 152 disposed therein. Also, the discrete solid elements 180, 182 can provide for improved bonding of the porous structure, or improved strength of the framework 144 or the materials provided in the opening 130.

A coating 184 can be disposed on the outer surface 122 including the opening 130. The coating 184 can be made from a heat resistant material, for example, to improve cooling of the outer wall 118. Film holes 186 can be disposed in the coating 184 to fluidly couple the opening 130 to the exterior. Alternatively, the coating 184 can be porous, such as a dense vertically micro-cracked thermal barrier coating. In another example, the interior surface 120, including the opening 130, can be covered or coated, and provided with discrete holes. Such an organization can further meter the total amount of cooling fluid provided to the opening 130.

Additionally, it is contemplated that the film holes 186 can extend into the porous structure 152. For example, the film holes 186 extend through the coating 184 and into the porous structure 152. It should be further contemplated that the film holes can be defined in the porous structure 152, the framework 144, or any combination thereof with or without the coating 184, in non-limiting examples.

Figure 9:
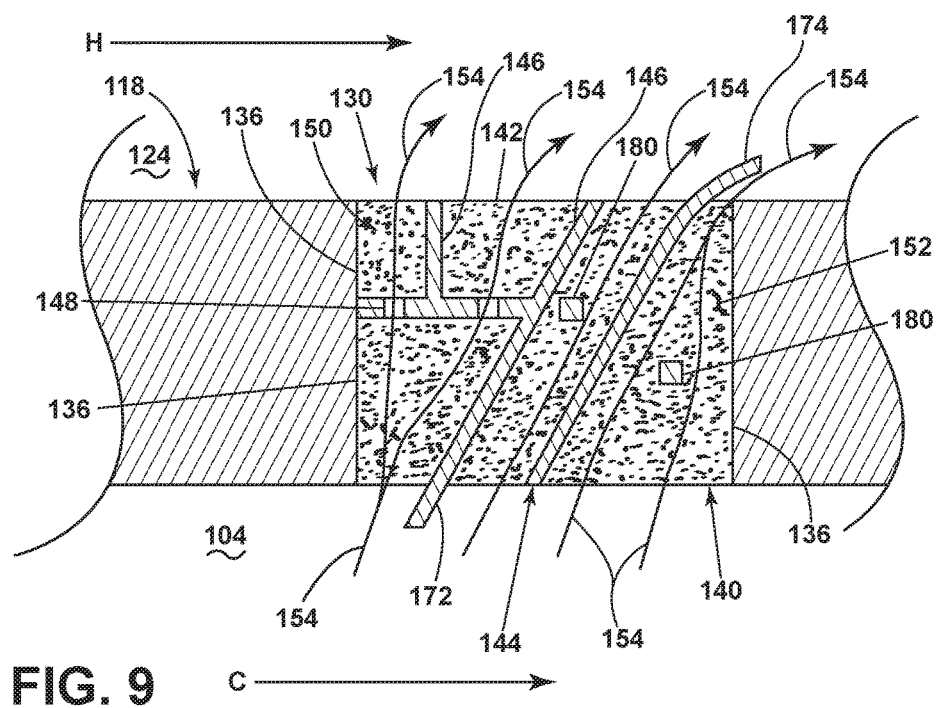
FIG. 9 is a cross-sectional view of the wall of FIG. 3, including an opening in the wall, having a framework extending beyond the hole.

The elements as disclosed in FIGS. 4-8 can be combined in any manner, using some of all of the elements to generate a particular organization within the opening 130. Referring to FIG. 9, one such exemplary combination of the elements is illustrated. For example, the framework 144 includes a combination of solid elements 146 organized parallel to and orthogonal to the inner and outer surfaces 120, 122 as well as some solid elements 146 being angular. Additionally, the framework 144 includes discrete solid elements 180 disposed within the defined interstitial spaces 150. Some of the solid elements include discrete orifices to define flow paths 154. Some of the flow paths 154 can converge from two flow paths 154 into a single flow path 154, while others can separate into multiple flow paths 154 within the porous structures 152. The framework 144 can also include a combination of interior and exterior extensions 172, 174 to direct the flow paths 154 both from the interior 104 and passing to the exterior 124. Some of the interstitial spaces 150 can be converging and others can be diverging. Such a geometry can be used to adapt the flow velocity or pressures within the interstitial spaces 150 to optimize a flow of cooling fluid locally. Additionally, such geometry can be used in conjunction with increasing or decreasing porosities to further adapt the flow of cooling fluid. It should be understood that while the geometries of FIGS. 4-8 are illustrated in the two-dimensional plane of the page, the features, geometries, and flows can pass in three-dimensional space, located in or out of the page. Such passages, features, geometries, and flows can be in a combination of axial, radial, tangential, or any combination thereof in three-dimensional space.

It should be appreciated that the opening 130 having the framework 144 with a porous structure 152 disposed therein, can have a multitude of differing organizations and geometries to provide a flow of cooling fluid through the opening 130 as is desired.

A method of making an airfoil 90 for a turbine engine 10 can include forming a wall 118 with at least one opening 130. A framework 144 can be disposed in the opening 130 to define at least one interstitial space 150. At least some of the interstitial spaces 150 are filled with a porous structure 152. The method can further include forming at least two of the (1) wall 118, (2) opening 130, (3) framework 144, and (4) porous structure 152 by additive manufacturing. Furthermore, the method can include forming at least three of, or all of the (1) wall 118, (2) opening 130, (3) framework 144, and (4) porous structure 152 by additive manufacturing.

It should be appreciated that forming the wall 118, having the opening 130 with a framework 144 and porous structure 152 can provide thermal enhancement such as improved cooling of the structure. Additionally, the framework 144 can provide mechanical enhancement, such as improved bonding for the porous structure 152 with increase local stability or directionality. Furthermore, such forming can provide improved local backflow margins, flow rates, and strength for the engine component. Further still, the wall 118 as disclosed can provide for up to 30% reduction in required cooling flows or more to improve efficiency.

It is contemplated that the wall 118 and the structures described herein can be made with additive manufacturing. Additive manufacturing, such as 3D printing, can be used to form complex cooling circuit designs, having shaping or metering sections, porosities, complex circuits, holes, conduits, channels, or similar geometry, which is otherwise difficult to achieve with other manufacturing methods like drilling or casting. Additionally, the wall 118 can be formed with additive manufacturing. Typical methods for forming porous metals can result in uneven porosity among areas of the porous metals. Utilizing additive manufacturing can enable a manufacturer to achieve a more uniform porosity along the entire porous structure or a desired distribution or controlled porosity to provide a deterministic flow. Furthermore, such manufacturing can provide a more precisely made product, having a higher yield as compared to other manufacturing strategies.

It should be appreciated that the airfoil 90 or engine component, utilizing the wall 118 with the opening 130 provides for even cooling distribution for a flow of cooling fluid. An additive manufacturing build of the regions could provide a precise distribution, particularly permitting an even porosity for the porous layer(s). Additionally, the use of additive manufacturing can permit particular shaping or tailoring of the framework 144, solid elements 146, discrete orifices 148, interstitial spaces 150, and porous structures 152 to control the flows being provided through the opening 130. Such shaping or tailoring can include outlet shaping to particularly direct or spread the cooling fluid. Such outlet shaping can be done in the porous structures 152, the framework 144, the opening 130, or a coating disposed thereon. Utilizing such a porous structure permits the flow of a fluid through the engine component, while retaining less heat to remain cooler. As such, the cooling, such as surface film cooling, provided through the walls of such engine components can be enhanced. The enhanced cooling reduces the required flow of cooling fluid, such as up to 30%. Such a reduction can increase engine efficiency. Furthermore, reduced blowing ratios can obtain better surface film cooling to increase component lifetime or reduce required maintenance.

It should be appreciated that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
   an outer wall having an outer surface and an inner surface bounding an interior, the outer wall defining a pressure side and a suction side extending axially between a leading edge and a trailing edge and extending radially between a root and a tip;
   at least one opening formed in the outer wall;
   a framework provided within the at least one opening defining interstitial spaces within the framework; and
   a porous structure provided in at least some of the interstitial spaces.

2. The airfoil of claim 1 wherein the porous structure is provided in all the interstitial spaces.

3. The airfoil of claim 1 wherein the framework are integrally formed with the outer wall.

4. The airfoil of claim 1 wherein the framework defines at least one of a mesh, interlaced structure, or lattice with the interstitial spaces.

5. The airfoil of claim 1 wherein the framework is made of solid elements that are coupled to each other.

6. The airfoil of claim 5 wherein at least some of the solid elements are not coupled to each other.

7. The airfoil of claim 1 further comprising discrete orifices formed through the framework.

8. The airfoil of claim 1 wherein the at least one opening defines a centerline and at least a portion of the framework is arranged parallel to the centerline.

9. The airfoil of claim 8 wherein at least some of the framework is not parallel to the centerline.

10. The airfoil of claim 9 wherein at least some of the parallel and non-parallel framework intersects each other.

11. The airfoil of claim 10 wherein at least some of the framework includes discrete orifices.

12. The airfoil of claim 11 wherein at least an end portion of some of the framework is angled with respect to the centerline to define angled portions.

13. The airfoil of claim 12 wherein the angled portions are located within one of an inlet or outlet of the at least one opening.

14. The airfoil of claim 1 wherein at least some of the framework extends beyond the opening.

15. An engine component for a turbine engine, which generates a hot gas flow, and provides a cooling fluid flow, comprising:
    a wall separating the hot gas flow from the cooling fluid flow and having a first surface along with the hot gas flow in a hot flow path and a second surface facing the cooling fluid flow;
    at least one opening formed in the wall;

a framework provided within the at least one opening, with interstitial spaces defined within the framework, wherein at least some of the framework extends beyond the at least one opening; and a porous structure provided in at least some of the interstitial spaces.

16. The engine component of claim 15 wherein the porous structure is provided in all the interstitial spaces.

17. The engine component of claim 15 wherein the framework is integrally formed with the wall.

18. The engine component of claim 15 wherein the framework defines at least one of a mesh, interlaced structure, or lattice with the interstitial spaces.

19. The engine component of claim 15 wherein the framework includes solid elements that are coupled to each other.

20. The engine component of claim 19 wherein at least some of the solid elements are not coupled to each other.

21. The engine component of claim 15 wherein at least some of the framework has discrete orifices.

22. The engine component of claim 15 wherein the at least one opening defines a centerline and at least some of the framework is arranged parallel to the centerline.

23. The engine component of claim 22 wherein at least some of the framework is not parallel to the centerline.

24. The engine component of claim 23 wherein at least some of the parallel and non-parallel portions of the framework intersect each other.

25. The engine component of claim 24 wherein at least some of the framework has discrete orifices.

26. The engine component of claim 25 wherein at least an end portion of some of the framework is angled relative to the centerline to define angled portions.

27. The engine component of claim 26 wherein the angled portions are located within one of an inlet or outlet of the at least one opening.

28. An engine component for a turbine engine, which generates a hot gas flow, and provides a cooling fluid flow, comprising:

a wall separating the hot gas flow from the cooling fluid flow and having a first surface along with the hot gas flow in a hot flow path and a second surface facing the cooling fluid flow;

at least one opening formed in the wall including an inlet and an outlet, and defining a centerline;

a framework provided within the at least one opening and including an end portion, with interstitial spaces defined within the framework, with at least some of the framework including discrete orifices and with at least some of the framework arranged parallel to the centerline and at least some of the framework not arranged parallel to the centerline, wherein at least some of the parallel portions of the frame work and some of the non-parallel portions of the framework intersect each other, and wherein the end portion is angled relative to the centerline to define an angled portion of the framework with the angled portions located within one of the inlet or the outlet of the at least one opening; and a porous structure provided in at least some of the interstitial spaces.

29. The engine component of claim 28 wherein the porous structure is provided in all the interstitial spaces.

30. The engine component of claim 28 wherein the framework defines at least one of a mesh, interlaced structure, or lattice with the interstitial spaces.

31. The engine component of claim 28 wherein the framework includes solid elements that are coupled to each other.

32. The engine component of claim 31 wherein at least some of the solid elements are not coupled to each other.

* * * * *